June 26, 1962  R. D. HULL  3,041,002
LINE PICKUP MEANS FOR CLOSED-FACE SPINNING REEL
Original Filed Aug. 27, 1957  2 Sheets-Sheet 1
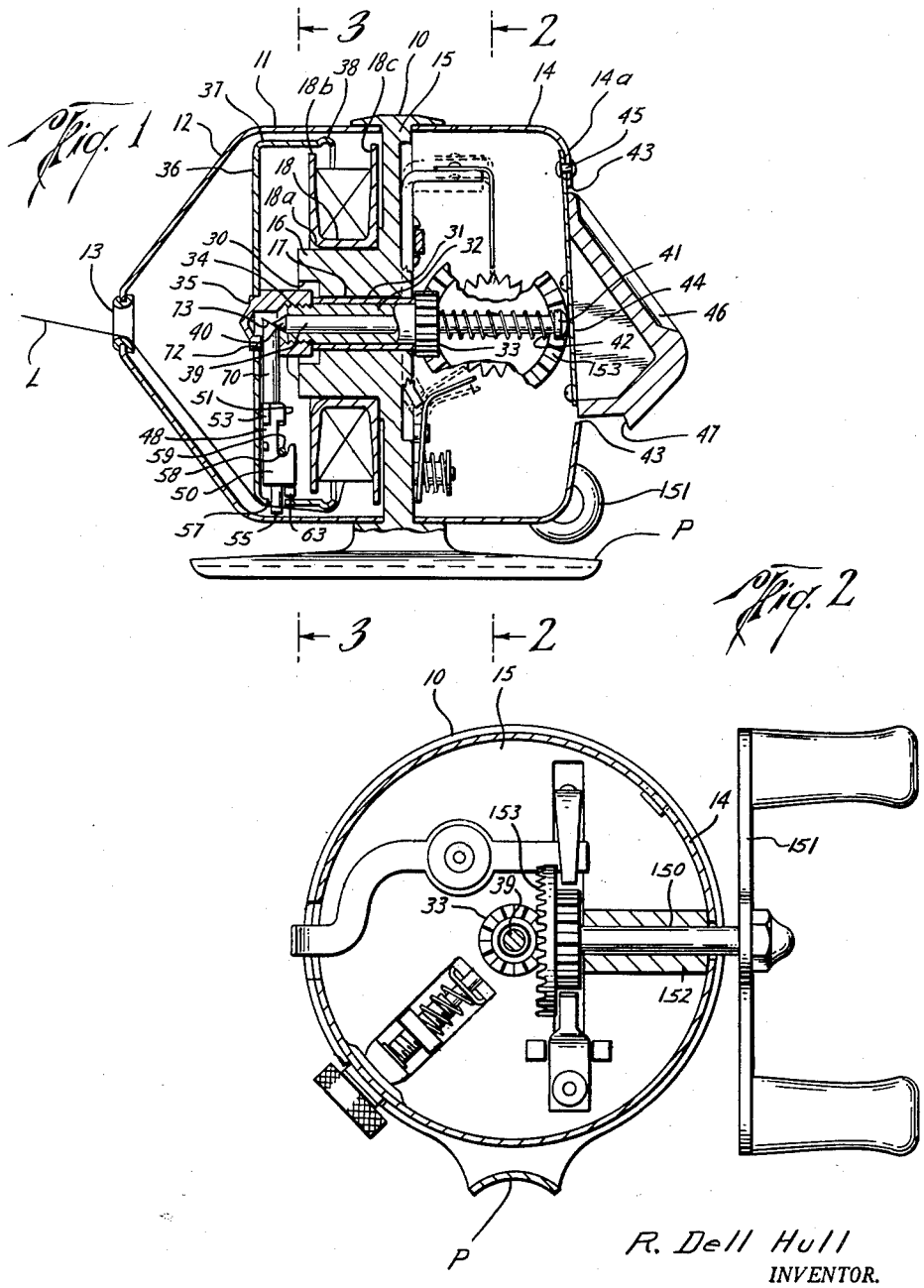
R. Dell Hull
INVENTOR.
BY
ATTORNEY

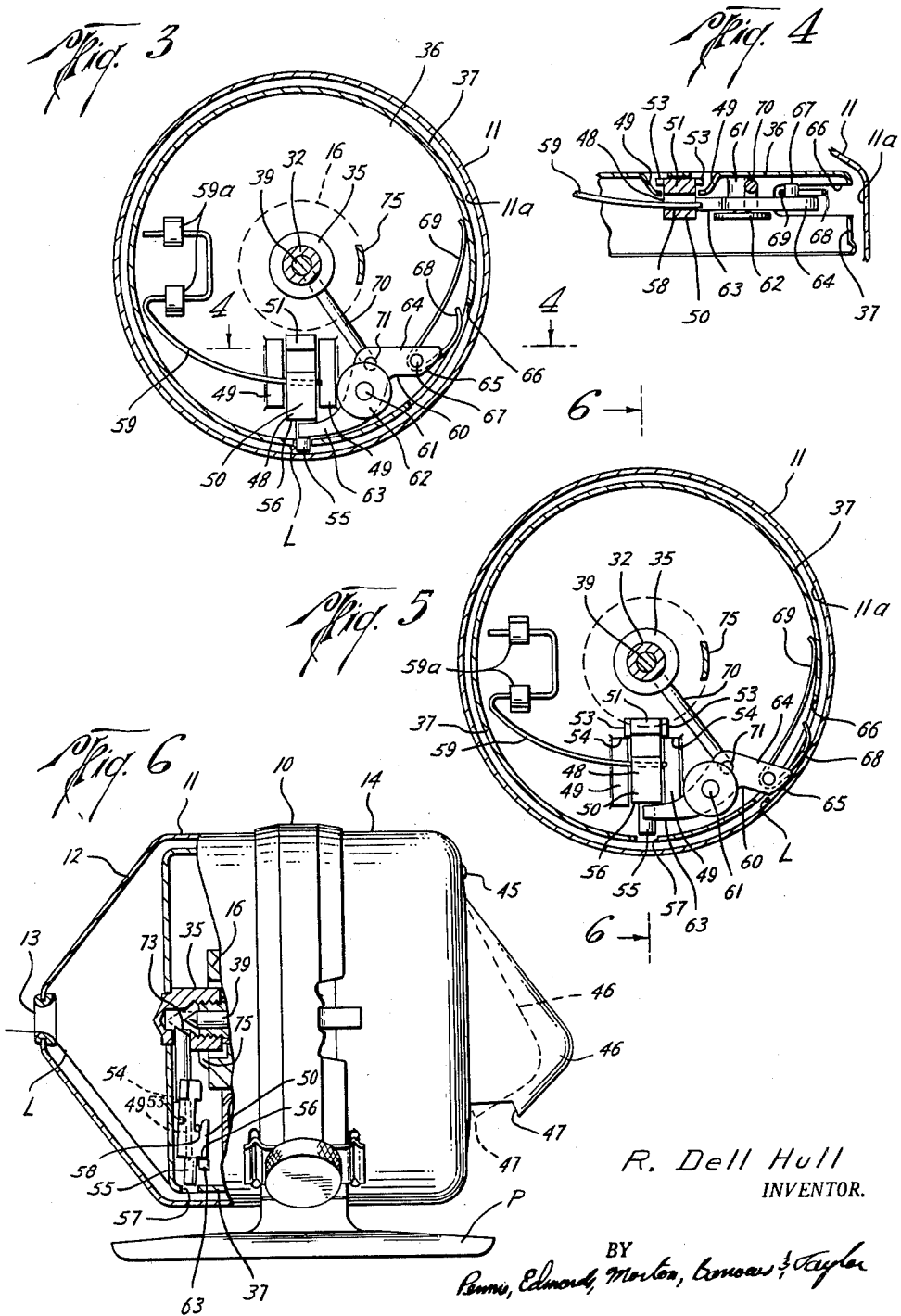

United States Patent Office 3,041,002
Patented June 26, 1962

3,041,002
LINE PICKUP MEANS FOR CLOSED-FACE SPINNING REEL
R. Dell Hull, 1131 E. Easton St., Tulsa, Okla.
Original application Aug. 27, 1957, Ser. No. 680,501. Divided and this application Jan. 26, 1959, Ser. No. 788,889
8 Claims. (Cl. 242—84.2)

This application is a division of my co-pending application Serial No. 680,501, filed August 27, 1957, for "Closed-Face Spinning Reel," and now abandoned.

This invention relates to fishing reels and more particularly to improvements in spinning reels.

The present invention is directed to improvements in spinning reels of the so-called "closed-face" type. In this type of spinning reel, the line spool is enclosed within a casing normally provided with a front portion or cover, which may be of conical or concave-convex form, having a central opening or eye through which the line travels as it moves over the front face or flange of the line spool in passage to and from the spool, the line opening being ordinarily co-axial with the axis of the spool. Reels of this general type are illustrated in my U.S. Patents Nos. 2,668,025 and 2,675,192.

A primary object of the present invention is to provide a spinning reel of the general type described in which the various operating and line control elements are of improved and generally simplified design, whereby to improve the efficiency and ease of operation, and to reduce cost of construction of the reel.

A particular aspect of the invention resides in the provision of a more efficient and simplified form of line pickup pin and the control therefor employed in retrieving the line. More specifically, the invention provides a novel and improved line pick-up pin control which is especially economical to manufacture, durable and reliable in operation, and of simplified construction.

Other and more specific objects and advantages of this invention will become more readily apparent from the following detailed description when read in conjunction with the accompanying drawings which illustrate a useful embodiment of the improved reel structure in accordance with the present invention.

In the drawing:

FIG. 1 is a longitudinal sectional view of the reel showing the parts in the positions occupied during rewinding;

FIG. 2 is a transverse cross-sectional view taken generally along line 2—2 of FIG. 1;

FIG. 3 is a transverse cross-sectional view taken generally along line 3—3 of FIG. 1;

FIG. 4 is a fragmentary view, partly in section, taken along line 4—4 of FIG. 3;

FIG. 5 is a view similar to FIG. 3, showing the parts in another position; and

FIG. 6 is a view, partly in elevation and partly in longitudinal section, taken along line 6—6 of FIG. 5 and illustrating the position of the pick-up elements during a cast.

Referring to the drawings:

The reel comprises a generally tubular casing 10 constructed of any suitable material, such as metal, plastic, or the like, and is provided with a front cover 11 insertible in the forward end portion of casing 10 and removably secured thereto in a manner to be hereinafter described. Casing 10 is provided with the usual support plate P for attaching the reel to the reel seat of a fishing rod in the usual manner. The forward portion of cover 11 is formed with a forwardly tapered conical portion 12 provided at its apex with a line guide opening 13 through which line L may pass to and from the interior of the cover. A rear cover 14 fits into the rear end portion of casing 10 and is removably secured thereto in a manner to be described subsequently. A wall 15 extends across casing 10 and has formed in the center thereof a forwardly projecting cylindrical boss 16 having an axial bore 17. A line spool 18 having an axial bore 18a and forward and rear flanges 18b and 18c, respectively, is mounted on boss 16 in front of wall 15 and is arranged for controlled rotation about boss 16, as will be more fully described hereinafter.

Rotation of spool 18 about boss 16 is controlled by a splipping clutch or drag mechanism, which forms the subject matter of my copending application Ser. No. 788,813, filed January 26, 1959, now Patent No. 2,991,957.

The forward end of bore 17 is counterbored for a short distance to provide the annular recess 30, and an antifriction bearing 31 is disposed in bore 17 and projects slightly forwardly into recess 30, as best seen particularly in FIG. 1. A tubular shaft 32 is slidably inserted in the bore of bearing 31 and is rotatable therein and carries on its rearward end a pinion 33 which is fixedly secured on the shaft and bears against the rearward end of bearing 31, which forms a stop therefor. The forward end of shaft 32 extends in front of the end of boss 16 and is reduced in diameter and is externally threaded at 34 to threadedly receive the hollow hub 35 of a circular pick-up head 36 which is secured to hub 35 and has about its outer periphery an annular flange 37 which projects rearwardly over the outer periphery of spool flange 18b to a point intermediate the spool flanges. The inner end of hub 35 when screwed on threads 34 of the shaft will extend into recess 30 and abut the forward end of bearing 31 and thereby draw pinion 33 against the rearward end of bearing 32 and hold these parts together. The rearward end of flange 37 is rounded at 38 to permit smooth passage of line L thereover in its movement to and from spool 18.

A crank shaft 150 (FIG. 2) is mounted in casing 10 at right angles to its longitudinal axis and projects radially through the wall of the casing and has mounted on its outer end a winding handle 151. The inner end of crank shaft 150 is journaled in a support bearing 152 which is supported on the rear face of wall 15. Crank shaft 150 carries on its inner end a gear 153 which is in mesh with pinion 33, whereby rotation of crank shaft 150 will rotate shaft 32 and pick-up head 36.

A cylindrical control rod 39 extends slidably through the bore of shaft 32 and through pinion 33 and projects rearwardly from the latter. The forward end of rod 39 extends into the bore of hub 35, as best seen in FIGS. 1 and 6, and has its forward end shaped to provide the forwardly tapering conical tip 40. The rearwardly projection portion of control rod 39 extends to a point adjacent the rear wall 14a of rear cover 14 and has mounted on its rearward end a rounded head 41. A coil spring 42 is mounted about the rear portion of rod 39 and is disposed in compression between head 41 and pinion 33, thereby normally urging the control rod rearwardly in shaft 32. The rear wall 14a of cover 14 is provided with an opening 43 and a leaf spring 44 having its upper end secured to the upper edge of opening 43 at 45 depends into opening 43. The free portion of the leaf spring is adapted to be resiliently pressed against head 41 on the control rod by pressure applied through a thumb pressure plate 46 which is secured to the rear face of leaf spring 44 and is projectable therewith through opening 43. Thumb pressure plate 46 is provided with a shoulder 47 which is adapted to engage the lower edge of opening 43 to limit the inward movement of leaf spring 44. It will be understood that when pressure is applied to thumb plate 46 leaf spring 44 will push against head 41 to overcome the resistance of coil spring 42 and thus urge control rod 39 forwardly against the resistance of coil spring 42. When pressure is relieved from thumb pressure plate 46, the normal resilience of leaf spring 44 will cause the leaf spring to retract and permit coil spring 42 to urge control rod 39 to its rearward position, as best seen in FIG. 1.

The axial movements of control rod 39 are employed to actuate the line pick-up and line-feathering elements of the reel, the latter of which forms the subject matter of my copending application Ser. No. 680,501, filed August 27, 1957, and now abandoned. The line pick-up member includes a generally rectangular slide 48 disposed on the inner face of pick-up head 36 for axial sliding movement thereover between a pair of guide rails 49—49. The latter are spaced rearwardly relative to the inner face of head 36 (FIG. 4), being preferably formed by appropriately punching the metal forming the wall of head 36 and forcing the punched portions rearwardly to the position shown. Slide 48 has a maximum thickness, from front to rear, somewhat greater than the distance between the inner face of head 36 and the outer faces of rails 49, so that the body of slide 48 will project rearwardly beyond the outer surfaces of the rails. The thickness of slide 48 is reduced somewhat from its rearward face at a point intermediate its ends to form the relatively thick outer head 50 at the outer end of the slide and the relatively thick inner head 51 at the inner end of the slide. The latter is formed, or otherwise provided, with a pair of lugs 53—53 (FIGS. 4 and 5) extending laterally from opposite sides thereof adjacent the forward face of head 51. The front-to-rear thickness of lugs 53 is less than the distance between the inner face of head 36 and the inner surfaces of rails 49, as best seen in FIG. 4, and when slide 48 is seated against the inner surface of head 36, lug 53 will slide freely beneath rails 49. However, as best seen in FIGS. 4 and 6, when the inner head 51 of the slide is moved longitudinally inwardly past the inner ends of flanges 49 and head 51 is then raised rearwardly with respect to the inner surface of head 36, the outer ends of lugs 53 are adapted to engage the inner ends 54 of rails 49 and limit outward longitudinal movement of the slide between the rails, for purposes to be more fully described subsequently. The outer end of slide 48 carries a cylindrical pick-up pin 55 which is smaller in area than the end of outer head 50, to thereby form an outwardly facing shoulder 56 about the inner end of pin 55. The latter is positioned for registration with an opening 57 provided through flange 37 and is adapted to be projected and retracted through opening 57 by corresponding movements of slide 48. The inner end of outer head 50 is undercut to provide the transverse notch 58 (FIGS. 1 and 6) which is adapted to receive the free end of a wire spring 59, the opposite end of which is suitably anchored to the inner face of head 36 by means of the clamps 59a. The spring 59 is formed and positioned so that its free end will normally tend to occupy a position spaced rearwardly from the inner face of head 36 and, therefore, when the free end of spring 59 is seated in notch 58, the pressure exerted by the spring will act both to urge slide 48 radially outwardly between rails 49—49 and to lift the inner end of slide 48 rearwardly away from the inner face of head 36, as best seen in FIG. 6. With this arrangement it will be seen that when the slide is moved inwardly spring 59 will lift inner head 51 away from the inner face of head 36 and cause the outer ends of lugs 53 to abut against the inner ends 54 of rails 49, thus locking the slide in its inward position and pick-up pin 55 in its retracted position (FIGS. 5 and 6). Small auxiliary lugs 53' projecting laterally from the slide 48, intermediate its ends, engage the forward surfaces of the rails 49 to limit the extent of rearward movement of the slide. The auxiliary lugs 53' are of less thickness than the end lugs 53, so that at least portions of the lugs 53 overlie the ends of rails 49 when the slide 48 is moved to its limit position away from the inner face of the pick-up head 36. When inner head 51 is thrust forwardly toward the rearward face of head 36, lugs 53 will drop beneath rails 49 and the force of spring 59 will then urge slide 48 and pick-up pin 55 to the projected position of the latter (FIGS. 1 and 3).

The mechanism employed to retract and release slide 48, for retracting and projecting pick-up pin 55, is also best seen in FIGS. 3 to 6. This mechanism comprises a bell crank 60 pivotally mounted on the rearward face of head 36 on the pivot pin 61 and secured to the head by means of the washer 62 which is riveted to the outer end of the pivot pin. One arm 63 of the lever is positioned to engage shoulder 56 on the outer end of the slide and rearwardly of pick-up pin 55 so that when the lever is swung in a direction to move arm 63 inwardly it will thrust against shoulder 56 and urge slide 48 inwardly, thereby retracting pick-up pin 55, as best seen in FIGS. 5 and 6. By positioning arm 63 rearwardly of pick-up pin 55, as shown, the lever arm serves to confine the outer end of the slide 48 against dislodgment from between the guide rails 49. The other arm 64 of lever 60 is provided at its outer end with a cam surface 65 which is projectable through a slot 66 provided in flange 37. Arm 64 carries a forwardly projecting lug 67 about which is bent a wire spring to provide a short leg 68 and a long leg 69. The spring 68, 69 is fixed to the arm 64 and/or lug 67, whereby the separate legs 68 and 69 form, in effect, individual spring elements. Short leg 68 is outwardly curved and is arranged to be projected through slot 66 slightly in advance of the cam end 65 of the arm as the latter swings outwardly and to engage the inner surface 11a of front cover 11 in advance of cam end 65 to thereby form a resilient yieldable barrier to the passage of line L between the flange 37 and surface 11a as the line unwinds from spool 18 in passage from the reel. This shorter spring arm 68 comprises the controllable feathering device for yieldably squeezing or pressing line L against inner surface 11a, and thereby provides a relative sensitive control for the movement of the line from the reel. FIG. 5 illustrates arm 64 moved outwardly of slot 66 to a position at which cam end 65 is placed in direct engagement with surface 11a, to thereby provide a non-yieldable positive stop for line L. At any position of cam end 65 prior to this direct engagement with surface 11a, spring arm 68 will constitute the only barrier to the movement of line L and the extent to which arm 68 is forced against surface 11a will determine the pressure placed on line L in effecting control of its movement. Longer spring arm 69 has its free end bearing against the inner surface of flange 37 and its arrangement is such as to normally urge lever arm 64 to the retracted position (FIG. 3), thereby urging lever arm 63 outwardly and resiliently resisting its inward movement. Lever 60 is swung about pivot 61 by means of an operating rod 70 which has its outer end pivotally connected at 71 to lever 60 and has its inner end projecting through an opening 72 in the wall of hub 35 into a position wherein its inner end may be engaged by tip 40 of a control rod 39. The inner end of the operating rod 70 is cut at an angle to form the sloping cam surface 73, which is engageable by tip 40.

Longitudinal movement of control rod 39 and rotary movement of head 36 are employed to actuate pick-up pin 55 in the following manner: With rod 39 retracted to the position shown particularly in FIG. 1, pin 55 will be thrust radially outwardly through opening 57 under the urging of spring 59 and will be in position to engage line L for rewinding the same on the spool. In this position, it will be seen that tip 40 is retracted substantially relative to surface 73 on the end of the operating rod 70, so that the latter will be in its relatively retracted position, in which position arm 63 will be swung outwardly and arm 64 inwardly substantially as shown in FIG. 3. In order to now retract pin 55 to release the line for casting, control rod 39 will be thrust forward by pressure applied to thumb pressure plate 46, acting through leaf spring 44 against head 41 and overcoming the resistance of coil spring 42. Tip 40 on the end of the control rod will thus be pushed into engagement with surface 73 (broken lines FIG. 6) on the crank rod and will urge the latter outwardly, thereby swinging arm 63 inwardly against shoulder 56 and thrusting slide 48 inwardly until lugs 53 clear the inner ends 54 of rails 49, whereupon the pressure of spring 59 will lift lugs 53 into engagement with the inner ends of rails 49 and lock slide 48 in its inner position and thereby retracting pick-up pin 55 to the position shown in FIG. 5. Simultaneously, arm 64 of the bell crank lever will be thrust outwardly through slot 66 and cam end 65 will act to engage line L and prevent its withdrawal from the reel while the thumb pressure continues to be applied to plate 46. The reel is now ready for the cast, whereupon thumb pressure is relieved from control rod 39, which is retracted under the pressure of spring 42 thereby relieving the outward pressure on the operating rod 70, and this, in turn, will permit the pressure of longer spring arm 69 on the inner face of flange 37 to pull lever arm 64 inwardly and release line L as the lure is cast. Line L will then spin off of the spool and will pass over feathering spring 68, the pressure of which can now be regulated by lightly varying the thumb pressure on plate 46 which will move control rod 39 into correspondingly varying degrees of engagement with the cam end of the operating rod 70 and correspondingly vary the pressure applied through lever arm 64 to feathering spring 68. Since slide 48 will be held in its retracted position by engagement of lugs 53 with the inner ends of rails 49, the movement of lever arm 63 produced by the described feathering movements of lever arm 64 will not have any effect on slide 48. If it is desired to completely stop further outward movement of line L, the pressure applied to thumb plate 46 may be increased sufficiently to force cam end 65 into direct engagement with surface 11a. Thus, it will be seen that complete and delicate control of the line during the cast may be effected.

When it is desired to retrieve the line, handle 151 will be turned to rotate shaft 150 in the retrieving direction and the latter will, of course, rotate pick-up head 36. As the latter rotates, the rearward face of inner head 51 on the pick-up pin slide will come in contact with a cam lug 75 which projects forwardly from the forward end of boss 16 and is positioned in the path of rotary movement of inner head 51 when the latter is in its retracted position, as best seen in FIGS. 5 and 6. As head 51 engages cam 75, the latter will provide forward thrust against head 51 and push the latter forwardly so that lugs 53 will be pushed away from the ends of rails 49 to the position illustrated in FIG. 4, whereupon the pressure of spring 59 will act to thrust the slide outwardly and project pick-up pin 55 to its pick-up position. Continued rotation of handle 151 will reel in the line and wind it back on spool 18. At this stage of operations, control rod 39 will continue to remain in its retracted position; hence, no pressure will be exerted against the operating rod 70 and thus there will be no pressure on arm 63 which would tend to resist the outward movement of slide 48. When retrieving of the line has been completed, the reel is ready for application of thumb pressure to retract the pick-up pin and release the line for another cast, as previously described.

The reel herein described also includes improved antireverse and click mechanisms which form the subject matter of my copending application Ser. No. 788,814, filed January 26, 1959.

The reel also includes improved means providing easily securable and releasable connections for the front and rear covers to casing 10, which forms the subject matter of my copending application Ser. No. 789,039, filed January 26, 1959.

The reel constructed as heretofore described is relatively light in weight, comprises parts which may be easily and quickly assembled and is, therefore, quite low in cost of manufacture, and which, by reason of its novel features of construction and combination thereof as described, is exceptionally easy to use and very efficient and substantially fool-proof in operation.

It will be understood that various changes and modifications may be made in the details of the illustrative embodiment within the scope of the appended claims but without departing from the spirit of this invention.

I claim:

1. In a spinning reel of the type having a frame, a line spool mounted on the frame, a pick-up head rotatably mounted forwardly of the line spool, and a pick-up pin retractably carried by the pick-up head, the improvement characterized by said reel including a slide member mounted on said pick-up head, said pick-up pin being mounted on said slide member, said pick-up head having on one face thereof a pair of spaced guide rails receiving and guiding said slide in radial movement, said slide having retaining lugs thereon, spring means urging said slide radially outward, controllable means for moving said slide inward to a radially retracted position, abutment means on said pick-up head positioned to engage said retaining lugs when said slide is in a radially retracted position to hold said slide in said retracted position, and means for disengaging said lugs and abutment means upon rotation of said pick-up head, whereby to release said slide for radially outward movement under the influence of said spring means.

2. The reel of claim 1, in which said lugs are positioned relative to said abutment means so as to be engaged by said abutment means upon movement of the slide in one direction, generally at right angles to the said one face of the pick-up head, when the slide is in a radially retracted position, and said means for disengaging comprises cam means positioned in the path of rotation of said slide and operative upon rotation of the pick-up head to engage the slide and move it in a direction opposite to said one direction to disengage said lugs and abutment means.

3. The reel of claim 2, in which said spring means acts on said slide in a manner simultaneously to urge the slide radially outward and in said one direction, said spring means being operative to effect engagement between said lugs and abutment means upon radial retraction of said slide.

4. The reel of claim 1, in which said guide rails are of predetermined length, said abutment means are formed by end surfaces of said guide rails, said lugs are positioned to function in a first capacity by engaging said rails and slidably guiding said slide in radial movement, and in a second capacity by engaging said abutment means.

5. In a spinning reel of the type having a frame, a line spool mounted on the frame, a pick-up head rotatably mounted forwardly of the line spool, and a pick-up pin retractably carried by the pick-up head, the improvement characterized by said pick-up pin being mounted on a slide member, said pick-up head having on one face thereof a pair of spaced guide rails adapted to guide said slide in radial movement, said slide having retaining lugs thereon, abutment means for engaging said retaining lugs when said slide is in a radially retracted position, and means for disengaging said lugs and abutment means upon rotation of said pick-up head, said abutment means comprising the inner ends of said rails.

6. The reel of claim 5, in which said lugs are positioned to function in a first capacity by engaging said rails and guiding said slide in radial movement, said lugs and rails being so proportioned that said lugs move beyond the radially inner ends of said rails upon predetermined inward movement of said slide, and said slide is provided with a set of auxiliary lugs positioned to engage said rails intermediate their ends upon said predetermined inward movement of said slide.

7. In a spinning reel of the type having a frame, a line spool mounted on the frame, a pick-up head rotatably mounted in front of said spool and having a pick-up pin movable between extended and retracted operative positions, and means to actuate the pick-up pin comprising a control member disposed coaxially of the pick-up head and movable axially relative thereto, the improvement characterized by said reel including spring means acting on said pick-up pin to urge it to one of its operative positions, means independent of said control member for holding said pick-up pin in its other operative position, an operating rod supported by said pick-up head for radial movement relative thereto and adapted upon radially outward movement to move said pick-up pin to its said other operative position, said operating rod having a sloping cam surface at its inner end disposed adjacent the axis of said control member, said control member having a sloping surface disposed adjacent said sloping surface and engageable therewith upon axial movement of said control member, whereby upon axial movement of said control member in one direction said operating rod is moved radially outward, said spring means being operative to urge the pick-up pin to its extended position, and a pivoted lever interconnecting the operating rod and pick-up pin, whereby upon radially outward movement of the operating rod the pick-up pin is moved to its retracted position.

8. The reel of claim 7, in which the pivoted lever has a portion adapted upon radially outward movement of the operating rod to engage line flowing from the spool.

References Cited in the file of this patent
UNITED STATES PATENTS

| | | |
|---|---|---|
| 2,492,587 | Ledingham | Dec. 27, 1949 |
| 2,521,543 | Shakespeare et al. | Sept. 5, 1950 |
| 2,538,153 | Guthrie | Jan. 16, 1951 |
| 2,597,318 | Haase | May 20, 1952 |
| 2,736,510 | Skelton et al. | Feb. 28, 1956 |
| 2,828,088 | Denison et al. | Mar. 25, 1958 |
| 2,903,201 | Sarah | Sept. 8, 1959 |
| 2,915,258 | Hull | Dec. 1, 1959 |